US012764149B2

(12) United States Patent
Mannengal et al.

(10) Patent No.: US 12,764,149 B2
(45) **Date of Patent: *Oct. 13, 2026**

(54) SECURITY INCIDENT DETECTION BASED ON HISTORIAN CONFIGURATION DATA COLLECTED OVER TIME

(71) Applicant: Microsoft Technology Licensing, LLC, Redmond, WA (US)

(72) Inventors: Arun Ramadasan Mannengal, Sammamish, WA (US); Krishna Chaitanya Rudraraju, Bellevue, WA (US); Rajesh Kumaraswamy, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 45 days.

This patent is subject to a terminal disclaimer.

(21) Appl. No.: 18/901,879

(22) Filed: Sep. 30, 2024

(65) Prior Publication Data

US 2025/0023898 A1 Jan. 16, 2025

Related U.S. Application Data

(63) Continuation of application No. 17/835,552, filed on Jun. 8, 2022, now Pat. No. 12,132,749.

(51) Int. Cl.
*H04L 9/40* (2022.01)

(52) U.S. Cl.
CPC ................................ *H04L 63/1425* (2013.01)

(58) Field of Classification Search
CPC . H04L 63/12; H04L 63/1416; H04L 63/1425; H04L 63/20; G06N 20/00
See application file for complete search history.

(56) References Cited

U.S. PATENT DOCUMENTS

| | | | | |
|---|---|---|---|---|
| 11,537,959 | B2 * | 12/2022 | Upadhyay | G06F 9/4843 |
| 12,008,586 | B2 * | 6/2024 | Kwok | G06N 3/0442 |
| 12,132,749 | B2 * | 10/2024 | Mannengal | G06F 21/52 |
| 12,142,027 | B1 * | 11/2024 | Saraee | G06N 3/045 |
| 12,223,689 | B2 * | 2/2025 | Hamedi | G06N 3/045 |
| 12,299,162 | B1 * | 5/2025 | Butler | H04L 9/3213 |

* cited by examiner

*Primary Examiner* — Hosuk Song
(74) *Attorney, Agent, or Firm* — Ray Quinney & Nebeker P.C.; Tiffany B. Healy

(57) ABSTRACT

Security incident detection based on historian configuration data collected over time is described. Historic configuration data associated with a computing device is updated based on received configuration data indicative of a change in configuration of the computing device in a computer system. The historic configuration data indicates changes to configurations of the computing device over a time period. A determination that relationship between the computing device and an entity of the computer system has changed is made based on the updated historic configuration data. The updated historic configuration data is provided as input to a machine learning (ML) model configured to generate an indication of whether the updated historic configuration data evidences a security incident. In response to the ML model generating an indication that the updated historic configuration data evidences a security incident, a security alert indicative of the evidenced security incident is generated.

20 Claims, 6 Drawing Sheets

SECURITY INCIDENT DETECTION BASED ON HISTORIAN CONFIGURATION DATA COLLECTED OVER TIME

CROSS-REFERENCE TO RELATED APPLICATIONS

This application is a continuation of pending U.S. patent application Ser. No. 17/835,552, filed on Jun. 8, 2022, entitled "SECURITY INCIDENT DETECTION BASED ON HISTORIAN CONFIGURATION DATA COLLECTED OVER TIME," the entirety of which is incorporated by reference herein.

BACKGROUND

Computer systems may include various computing devices controlled by software and/or firmware. Over time, configurations of a computing device within a computer system may change. For example, a computing device may be added to the computer system, removed from the computer system, updated or otherwise modified, and/or have its configuration changed in another manner with respect to the computer system. A change in configuration may indicate a security incident has occurred. For instance, a malicious actor may deploy malware to a computing device that changes its configuration, including in a way evades detection. In some cases, the malware may make incremental changes to a computer device's configuration over time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods are described herein for security incident detection based on historian configuration data collected over time. Historic configuration data associated with a computing device is updated based on received configuration data indicative of a change in configuration of the computing device in a computer system. The historic configuration data indicates changes to configurations of the computing device over a time period. A determination that a relationship between the computing device and another entity of the computer system has changed is made based on the updated historic configuration data. The updated historic configuration data is provided as input to a machine learning (ML) model configured to generate an indication of whether the updated historic configuration data evidences a security incident. In response to an indication being generated that the updated historic configuration data evidences a security incident, a security alert is generated.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
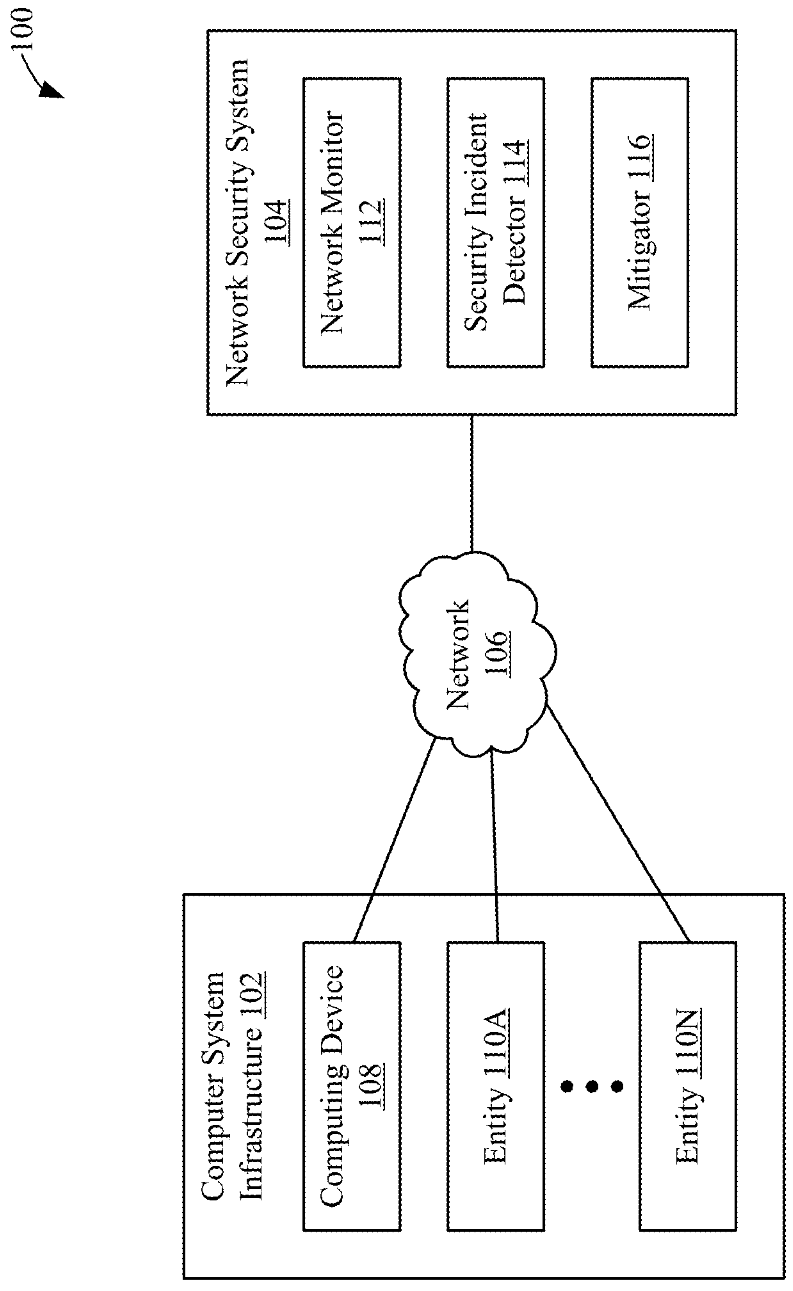
FIG. 1 is a block diagram of an example networked computing system configured to perform security incident detection based on historian configuration data collected over time, in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous exemplary embodiments are now described. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Systems and Methods for Security Incident Detection

Computer systems may include a wide variety of computing devices controlled by firmware or other software. Examples of such computing devices include sensors (e.g., temperature sensors, humidity sensors, acceleration sensors, pressure sensors, position sensors, and/or other physical condition sensors), display screens, smart devices (e.g., Internet-of-Things devices, such as smart thermostats), mobile computing devices (e.g., Microsoft® Surface® devices, laptop computers, notebook computers, tablet computers such as Apple iPad™ tablets, netbooks, etc.), stationary computing devices (e.g., desktop computers or personal computers (PCs)), and/or any other computing devices controlled by firmware or other software. Such computing devices may transmit and/or receive data over a network (e.g., a local area network (LAN), a wide area network (WAN), an enterprise network, the Internet, etc.) that includes one or more of wired and/or wireless portions. Such computing devices may be referred to as "networked devices."

Furthermore, a computer system, such as a cyber-physical system, may include various entities. A cyber-physical system is a computer system that includes interrelated physical and virtual entities. An entity of a computer system may be a networked computing device, a virtual component (e.g., a virtual machine, a software application, or a logical model) executing on a computing device, a stationary facility (e.g., an office building, a manufacturing facility, a warehouse, a room of a building) that includes one or more computing devices therein, a physical maintenance device of a facility (e.g., a cooling system, a heating system, a backup generator), a networking device of a facility (e.g., a host server, router, switch or other networking device), and/or any other type of physical or virtual component associated with one or more computing devices. Moreover, entities may be grouped based on type (e.g., virtual machines, stationary computing devices, servers, etc.), corresponding structure (e.g., entities within the same room of a building, entities associated with a manufacturing facility, etc.), associated systems (e.g., components of a cooling system of a building, manufacturing units of a manufacturing facility, etc.), geographic region, and/or any other grouping of entities, as described elsewhere herein.

Management of entities in a computer system may vary from one entity to another. For example, management for an entity may be directed to managing accuracy, convenience, coverage, economic impact, efficiency, flexibility, portability, reliability, security, and/or other factors associated with the entity. Entities may be configured or reconfigured with respect to a computer system over time. For example, an entity may be updated, added to the computer system, removed from the computer system, modified within the computer system, and/or otherwise reconfigured with respect to the computer system. As discussed in the Background section, such changes in configuration may indicate a security incident has occurred. In order to detect such a security incident, a computer system may include a security system that monitors configuration changes and detects when a change in a configuration indicates a security incident has occurred. However, malicious actors may deploy malware or otherwise compromise a computer system in a manner that is difficult to distinguish from benign configuration changes. For example, a malicious actor may deploy malware to a computing device in an attempt to gain illicit access to resources. The deployed malware may incrementally change a configuration of the computing device and/or other entities in the computer system over a period of time. In this context, it may be difficult to identify whether a security incident has occurred.

Embodiments described herein are directed to security incident detection for computer systems. In particular, systems, methods, apparatuses, and computer program products perform security incident detection based on received configuration data indicative of a change in configuration of a computing device in a computer system. A security system may update historic configuration data indicating changes to configurations of the computing device over a time period based on the received configuration data. The security system evaluates whether the updated historic configuration data indicates a change in a relationship between the computing device and an entity of the computer system and considers whether the change in the relationship evidences a security incident. As such, potential security incidents can be identified and steps to mitigate the incident can be taken to improve performance.

Security incidents may be detected in these and further ways, in embodiments. For instance, FIG. 1 is a block diagram of an example networked computing system 100 ("system 100" herein) configured to perform security incident detection based on historian configuration data collected over time, in accordance with an embodiment. As shown in FIG. 1, system 100 includes a computer system infrastructure 102 and a network security system 104. Computer system infrastructure 102 and network security system 104 are communicatively coupled via network 106. Network 106 may comprise one or more networks such as local area networks (LANs), wide area networks (WANs), enterprise networks, the Internet, etc., and may include one or more of wired and/or wireless portions. The features of system 100 are described in detail as follows.

Computer system infrastructure 102 may be a network-accessible computer system (e.g., a cloud-based computer system). For instance, computer system infrastructure 102 may be a cyber-physical system that includes interrelated physical and virtual entities. As shown in FIG. 1, computer system infrastructure 102 includes computing device 108 and entities 110A-110N. Computing device 108 may be any type of computing device described elsewhere herein. As shown in FIG. 1, computing device 108 may be external to entities 110A-110N; however, it is also contemplated that computing device 108 may be one of, included within one of, and/or otherwise associated with one of entities 110A-110N.

In an embodiment, one or more of computing device 108 and/or entities 110A-110N may be co-located (e.g., housed in one or more nearby buildings with associated components) to form a facility (e.g., a manufacturing facility or a datacenter), or may be arranged in other manners. Accordingly, one or more of entities 110A-110N may be a facility in a distributed collection of facilities.

Each of entities 110A-110N may comprise one or more computing devices, virtual components executing on a computing device, structures that include one or more computing devices therein, physical devices of a facility, and/or any other types of entities, as described elsewhere herein. For example, entities 110A-110N may include computing devices, structures, physical devices, and virtual components associated with a facility. For instance, entities 110A-110N may include a data storage (e.g., a server set that includes one or more storage nodes) for storing data associated with system 100.

Network security system 104 is configured to monitor changes in system 100, events executed by components of system 100, monitor network traffic of system 100, and detect security incidents in system 100. Network security system 104 may include one or more computing devices, which may be external to computer system infrastructure 102, and network monitor 112, security incident detector 114, and/or mitigator 116 are incorporated as services executed by the one or more computing devices. Alternatively, network security system 104 and associated services are executed by computing device 108 and/or entities 110A-110N of computer system infrastructure 102.

Network monitor 112 may be configured to generate a log (also referred to as a "configuration log") each time a configuration of computing device 108 and/or an entity of entities 110A-110N is changed with respect to system 100. The configuration log may be stored in a storage a data storage of computer system infrastructure 102 and/or in a data storage external to computer system infrastructure 102. Each configuration log may include a record of configuration parameters of the computing device and/or entity, relationships with other computing devices and/or entities, events executed by the computing device and/or entity, and/or any other information associated with the computing device and/or entity, as described elsewhere herein. In this context, network monitor 112 enables maintaining a historic trail of the configuration changes of computing device 108 and/or entities 110A-110N. This historic trail of configuration changes may indicate changes in relationships between interacting computing devices and/or other entities, changes in topologies of computer system infrastructure 102, and/or changes in groupings of components of computer system infrastructure 102. For instance, network monitor 112 may be configured to determine that a relationship between computing device 108 and an entity of entities 110A-110N has changed, and if so, provide the updated historic configuration data to security incident detector 114.

Security Incident Detector 114 is configured to detect security incidents that occur in system 100. For example, security incident detector 114 may evaluate historic configuration data (e.g., by evaluating configuration logs generated by network monitor 112) and determine whether such historic configuration data evidences a security incident. In accordance with an embodiment, security incident detector 114 includes one or more machine learning (ML) models configured to generate an indication that the historic configuration data evidences a security incident. Alternatively, security incident detector 114 communicates with one or more external ML models over network 106, not shown in FIG. 1 for brevity. Security incident detector 114 may be implemented in and/or incorporated with Microsoft® Defender for Cloud™ published by Microsoft® Corp, or Microsoft® Defender for IoT published by Microsoft® Corp., etc. Responsive to detecting a potential security incident, security incident detector 114 is configured to generate a security alert.

Mitigator 116 may be configured to cause a mitigation operation to be performed that mitigates the potential security incident. Depending on the implementation, the mitigation operation may be performed automatically (e.g., by mitigator 116, network security system 104, or another component of system 100), manually (e.g., by a user of computing device 108, by an administrator of an enterprise system including computing device 108, or by a developer associated with system 100), or by a combination of automatic and manual mitigation techniques. Examples of mitigation operations include transmitting a message indicative of the security incident to a developer associated with system 100, recommending (e.g., to a user of computing device 108, an administrator of an enterprise system including computing device 108, or a developer associated with system 100) an action to address the security incident, and/or implementing a protection mechanism (e.g., replacing a default password, monitoring a baseline configuration through a heartbeat signal, isolating a compromised computing device and/or entity, locking down a group of entities with relationships to a compromised computing device and/or entity, scanning entities connected to a compromised computing device and/or entity for security threats (e.g., malware), or powering down a compromised computing device and/or entity). Further mitigation operations are applicable to embodiments, including those described elsewhere herein or as would be understood by a person of skill in the relevant art(s) having benefit of this disclosure.

Furthermore, various remediation steps may be performed as part of a mitigation operation or in response to a mitigation operation being performed. For example, remediation steps may include: reviewing credentials related to potentially compromised user accounts, computing devices, and/or applications, reviewing activities performed by an application associated with a potentially compromised computing device and/or entity, identifying suspicious activities and/or entities, removing permissions of user account(s) and/or applications associated with the security incident, reviewing alerts in a firewall or other antivirus program related to potentially compromised computing devices and/or entities, and/or reviewing software updates associated with potentially compromised computing devices and/or entities.

Figure 2:
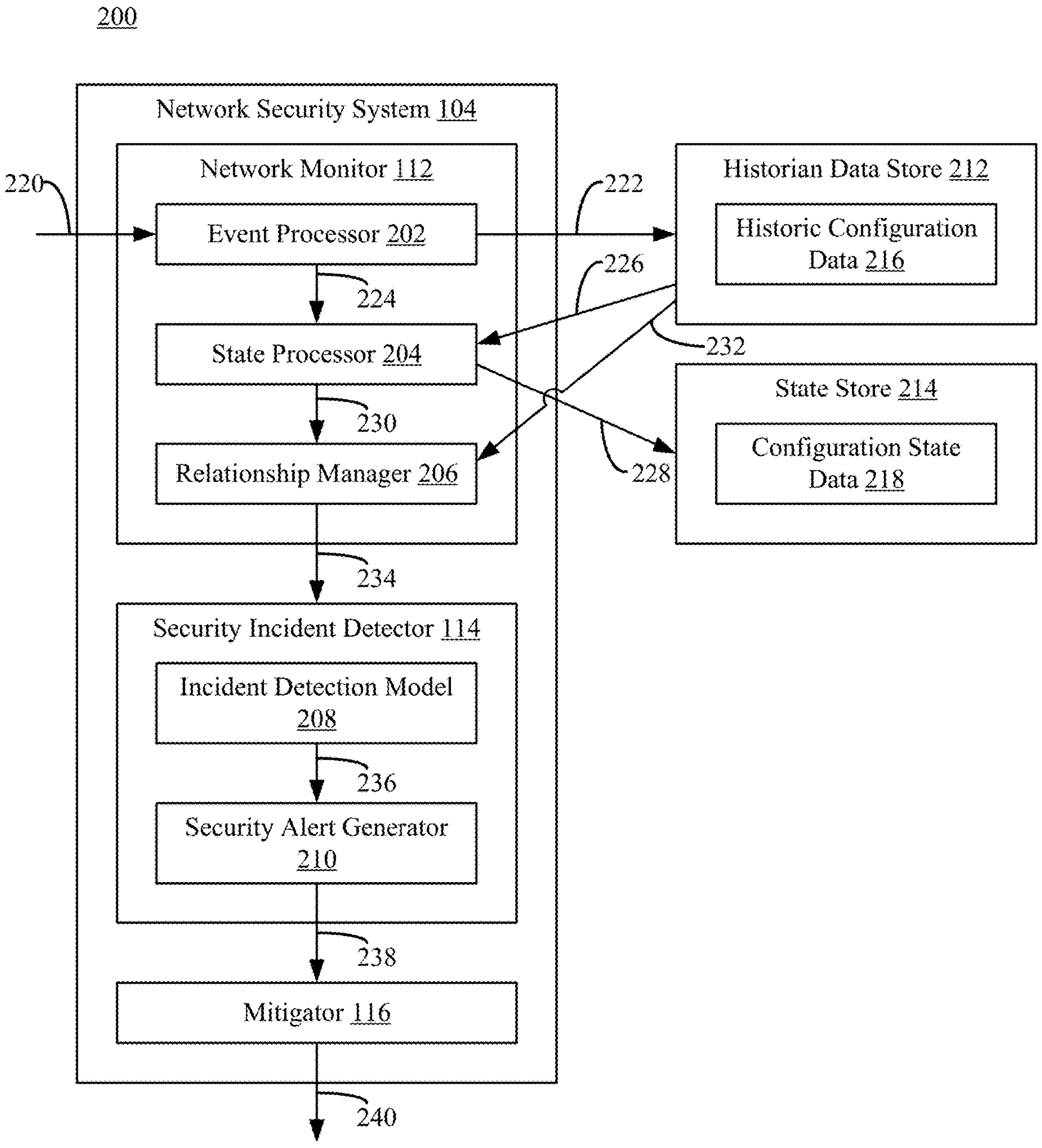
FIG. 2 is a block diagram of the network security system of FIG. 1 coupled to a historian data store and a state store, in accordance with an embodiment.
Figure 3A:
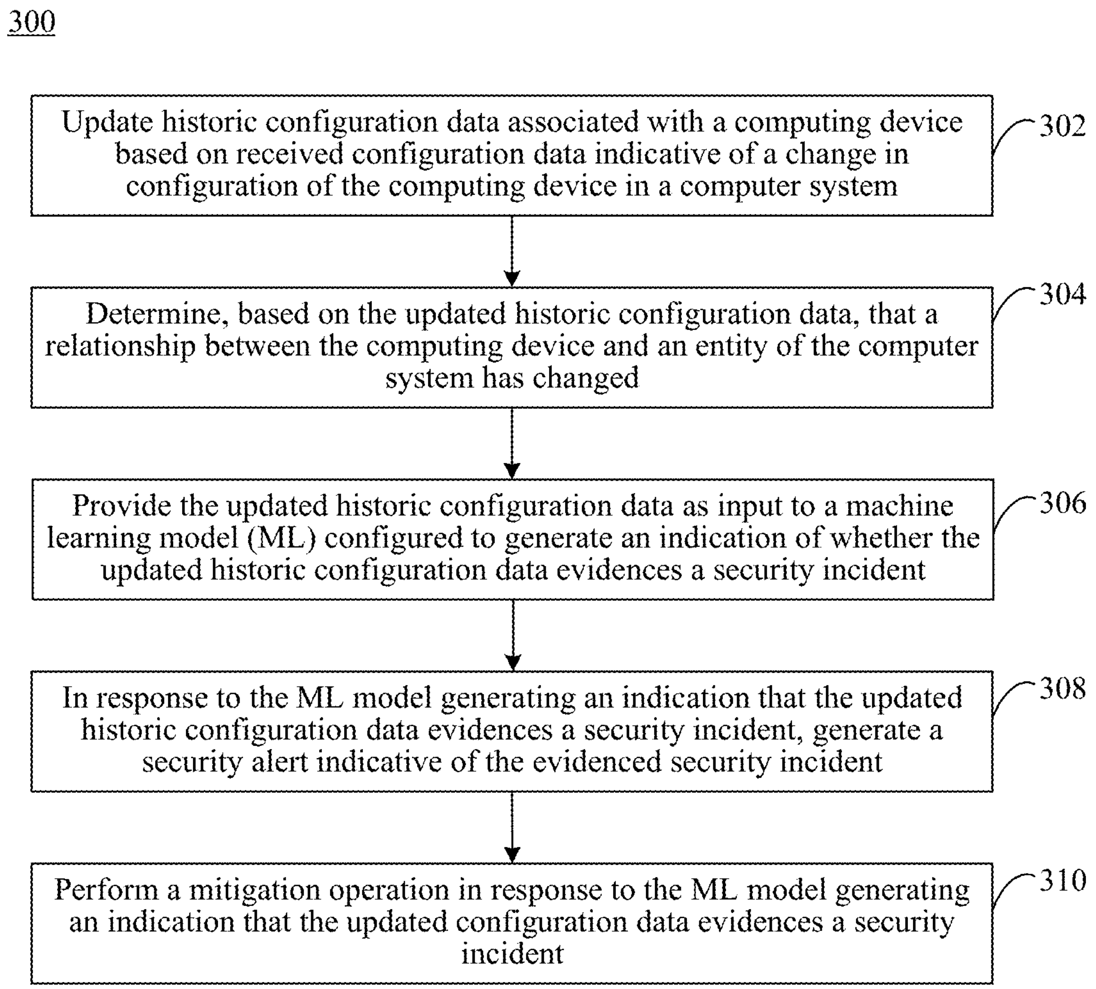
FIG. 3A depicts a flowchart of a process for detecting security incidents for computer systems, in accordance with an example embodiment.

Network security system 104 of FIG. 1 may be configured to detect security incidents for computer systems in various ways, in embodiments. For example, FIG. 2 shows a block diagram of the network security system 104 of FIG. 1 coupled to a historian data store 212 and a state store 214, in accordance with an embodiment. As shown in FIG. 2, network security system 104 includes a network monitor 112, a security incident detector 114, and a mitigator 116, as described above with respect to FIG. 1. Furthermore, as shown in FIG. 2, network monitor 112 includes an event processor 202, a state processor 204, and a relationship manager 206, and security incident detector 114 includes an incident detection model 208 and a security alert generator 210. Historian data store 212 may include historic configuration data 216 and/or any other information described herein. State store 214 may include configuration state data 218 and/or any other information described herein. For illustrative purposes, FIG. 2 is described below with respect to FIG. 3A. FIG. 3A depicts a flowchart 300 of a process for detecting security incidents for computer systems, in accordance with an example embodiment. Network security system 104 may operate according to flowchart 300 in embodiments. Note that not all steps of flowchart 300 need be performed in all embodiments. Further structural and operational embodiments will be apparent to persons skilled in the relevant art(s) based on the following description of FIGS. 2 and 3A.

As shown in FIG. 2, historian data store 212 and state store 214 may be external to network security system 104; however, it is also contemplated that all or a portion of historian data store 212 and/or state store 214 may be internal to a computing device executing network security system 104 or a component thereof. Furthermore, while historian data store 212 and state store 214 are illustrated as separate components in FIG. 2, it is also contemplated that historian data store 212 and state store 214 may be included in the same data storage. In accordance with an embodiment, historian data store 212 is an immutable data stream storage system. In this context, historian data store 212 enables maintaining a timeline of configuration changes to computing devices and/or entities in system 100 of FIG. 1 (e.g., as historic configuration data 216). For example, historic configuration data 216 stored in historian data store 212 may include configuration data associated with computing device 108, entities 110A-110N, computer system infrastructure 102, network security system 104, software executing on components of system 100, topologies of system 100, topologies of subsystems, relationships between computing devices and/or entities of system 100, as well as any other data associated with the configuration of system 100 and components thereof over time. Historic configuration data 216 may include all configuration data for computing devices and/or entities of system 100, or configuration data for computing devices and/or entities over a particular period of time (e.g., a number of years, months, weeks, days, etc.). State store 214 may be a mutable storage system configured to store configuration state data 218 indicative of the latest configuration data of computing devices and/or entities of system 100.

Flowchart 300 of FIG. 3A begins with step 302. In step 302, historic configuration data associated with the computing device is updated based on received configuration data indicative of a change in configuration of the computing device in a computer system. For example, event processor 202 of FIG. 2 is configured to update historic configuration data 216 stored in historian data store 212 based on received configuration data 220. As shown in FIG. 2, event processor 202 may update historic configuration data 216 by writing processed configuration data 222 to historic configuration data 216. In accordance with an immutable data stream storage system embodiment, processed configuration data 222 is stored as a configuration log of configuration data 222. Historic configuration data 216 may include all configuration logs for an entity, a predetermined number of configuration logs for an entity, and/or configuration logs in a particular time frame (e.g., last year, last six months, last month, last week, etc.).

In embodiments, event processor 202 may receive configuration data 220 in various ways. For example, configuration data 220 may be streamed to event processor 202, or retrieved from a data store of system 100. In accordance with a further embodiment, and as will be discussed further below with respect to FIGS. 4 and 5, event processor 202 may be configured to receive event records indicative of events executed by computing device 108, entities 110A-110N, and/or other components of system 100. Such event records may include configuration data 220, as well as other information associated with the executed events.

As shown in FIG. 2, event processor 202 is configured to generate indication 224, indicative of updates to historic configuration data 216 and/or any other information associated with configuration data 220. In accordance with a further embodiment, event processor 202 transmits indication 224 to relationship manager 206 and flowchart 300 proceeds to step 304. Alternatively, and as will be discussed further below with respect to FIG. 3B, network monitor 112 may include state processor 204, that is configured to determine if a configuration of a component of system 100 has changed responsive to receiving indication 224 and, if so, update configuration state data 218 based on the change in the configuration. As shown in FIG. 2, and as will be discussed further below with respect to FIG. 3B, state processor 204 generates indication 230 indicative of updates to historic configuration data 216, updates to configuration state data 218, and/or any other information associated with configuration data 220.

In step 304, a determination that a relationship between the computing device and an entity of the computer system has changed is made based on the updated historic configuration data and the stored state of the computing device. For example, as shown in FIG. 2, relationship manager 206 receives indication 230. Alternatively, relationship manager 206 receives indication 224. Responsive to receiving indication 230 or indication 224, relationship manager is configured to obtain updated historic configuration data 232, which may include all of or a portion of historic configuration data 216. Relationship manager 206 determines whether a relationship between computing device 108 and one or more of entities 110A-110N of FIG. 1 has changed based on updated historic configuration data 232. If a relationship between computing device 108 and one or more of entities 110A-110N has changed, relationship manager 206 generates change signal 234 and flowchart 300 proceeds to step 306. Otherwise, flowchart 300 ends. Change signal 234 may include an indication that a relationship between computing device 108 and one or more of entities 110A-110N has changed, as well as updated historic configuration data 232.

Relationship manager 206 may be further configured to determine and manage relationships between computing device 108 and one or more of entities 110A-110N. For instance, as described above, relationship manager 206 may determine if a relationship has changed. Moreover, relationship manager 206 may be further configured to store an indication of a relationship between the computing device 108 and one or more entities 110A-110N in historian data store 212 (e.g., as part of historic configuration data 216), state store 214 (e.g., as part of configuration state data 218), and/or in a relationship data store, not shown in FIG. 2 for brevity. Relationships may indicate any association between two or more of computing device 108 and entities 110A-110N. For instance, a relationship may indicate computing device 108 is part of a facility of system 100, computing device 108 is affected by a security control instance, computing device 108 is part of group critical infrastructure, computing device 108 is located at a particular geographic location, and/or any other type of relationship described elsewhere herein or as would otherwise be understood by a person of skill in the relevant art(s) having benefit of this disclosure.

In the context of the above, security control instances are an occurrence of a security control (e.g., a vulnerability is detected, an operating system not in compliance with an OS compliance policy is detected, a baseline policy violation is detected, or a default password of a user account is detected). Security control instances may be remediated proactively (e.g., a default password of a user is replaced with a non-default password), in an ongoing manner (e.g., a heartbeat signal monitors a baseline configuration of an entity with respect to a baseline policy to not deviate from the baseline policy), or reactively (e.g., upon detecting an unrecognized device is connected to a universal serial bus (USB) port of a computing device, the computing device is quarantined from a network).

In the context of the above, group critical infrastructure includes entities and computing devices that are core to the operations of a facility. For example, group critical infrastructure of a manufacturing unit facility may include backup generators and cooling systems. As another example, group critical infrastructure of a datacenter facility may include host servers and networking devices. Group critical infrastructures of other manufacturing unit facilities, datacenter facilities, and other types of facilities may include different, additional, or fewer entities and/or computing devices.

In step 306, the updated historic configuration data is provided as input to a machine learning (ML) model. The ML model is configured to generate an indication of whether the updated historic configuration data evidences a security incident. For example, security incident detector 114 of FIG. 2 receives change signal 234 and provides incident detection model 208 with updated historic configuration data 232. Incident detection model 208 is configured to generate an indication 236 if updated historic configuration data 232 evidences a security incident. As discussed above, change signal 234 may include updated historic configuration data 232. Alternatively, change signal 234 causes security incident detector 114 to obtain (e.g., retrieve) updated historic configuration data 232 from historian data store 212. Incident detection model 208 may apply any ML algorithms to updated historic configuration data 232. For example, incident detection model 208 may analyze changes in relationships between computing device 108 and/or entities 110A-110N over a time period. The analyzed changes in relationships over the time period may indicate at least one of: an unrecognized device inserted in a universal serial bus (USB) port of computing device 108 and/or an entity of entities 110A-110N, rapid password changes for a user account associated with computing device 108 and/or an entity of entities 110A-110N, abnormal network traffic between computing device 108 and an entity of entities 110A-110N, an internet protocol (IP) port of computing device 108 and/or an entity of entities 110A-110N being accessed by a software process, and/or any other indication that a security incident may have occurred. In this context, incident detection model 208 compares the changes in configurations of components of system 100, as well as relationships between such components, over time.

Furthermore, incident detection model 208 is configured to evaluate context of configuration changes in components of system 100 and consider whether these changes pose a security threat to the overall system. For example, incident detection model 208 may identify a device inserted in a USB port of computing device 108 and determine that the device is unlikely to evidence a security incident, determine that a configuration change to a computing device (e.g., computing device 108) or other entity (e.g., entities 110A-110N) is impacted by malware, determine that a configuration change to a component does not impact other components of the system, and/or otherwise evaluate the context of the configuration changes in components of system 100. Moreover, incident detection model 208 may consider telemetric data (e.g., information associated with the state of an entity and/or its environment) in determining whether updated historic configuration data 232 evidences a security incident. Telemetric data may indicate additional code (e.g., unwanted code, insecure software, malware, etc.) is executing on a device, an environment a device is located in has changed, a version of an operation system (OS) or other software executing on a device, and/or other information associated with the state of an entity and/or its environment (e.g., associated entities, geographic location, spatial location).

If incident detection model 208 determines updated historic configuration data 232 evidences a security incident, incident detection model 208 generates indication 236 and flowchart 300 proceeds to step 306. Otherwise, flowchart 300 ends. Incident detection model 208 may determine a confidence that updated historic configuration data 232 evidences a security incident. In this context, if the confidence is above a threshold, incident detection model 208 generates indication 236.

In step 308, in response to the ML model generating an indication that the updated historic configuration data evidences a security incident, a security alert indicative of the evidenced security incident is generated. For example, as shown in FIG. 2, security alert generator 210 is configured to receive indication 236 indicative that updated historic configuration data 232 evidences a security incident and generate security alert 238 indicative of the evidenced security incident.

In step 310, a mitigation operation is performed in response to the ML model generating an indication that the updated configuration data evidences a security incident. For example, as shown in FIG. 2, mitigator 116 is configured to generate mitigation signal 240 to cause a mitigation operation to be performed in response to incident detection model 208 generation indication 236 (e.g., and responsive to security alert generator 210 generating security alert 238). Depending on the mitigation operation to be performed, mitigation signal 240 may cause the mitigation operation to be performed by one or more of mitigator 116, network security system 104, another component or subcomponent of system 100 and/or another computing device or application, as described elsewhere herein, or as would be understood by a person of skill in the relevant art(s) having benefit of this disclosure.

Mitigation signal may be a notification (e.g., to an administrator) that indicates a potential security incident has been detected, provides a description of the potential security incident (e.g., by specifying configuration data of the updated historic configuration data that evidences the potential security incident, specifying a change in a relationship between two or more computing devices and/or entities that is indicative of the potential security incident, by specifying computing devices and/or entities associated with the change in the relationship, by specifying a timeline of changes in relationships between computing devices and/or entities over a period of time, by specifying potentially impacted computing devices and/or entities, by specifying the internet protocol (IP) address(es) corresponding to impacted computing devices and/or entities, by specifying times at which the potential security incident occurred, by specifying events and/or event records corresponding to the potential security incident, and/or by specifying an identifier of an entity that initiated an event corresponding to the potential security incident), causes a process corresponding to the updated historic configuration data that evidences the potential security incident to be terminated, causes a computing device and/or entity corresponding to the updated historic configuration data that evidences the potential security incident to be powered down, and/or causes network communication (e.g., by network 106) to a computing device and/or entity corresponding to the updated historic configuration data that evidences the security incident to be blocked. The notification may comprise a short messaging service (SMS) message, a telephone call, an e-mail, a notification that is presented via a security incident managing service, a security tool, etc. It is noted that notifications may be issued responsive to detecting potential security incidents regardless of whether such incident is actually a security incident. In this way, an administrator may decide for himself or herself as to whether the detected incident is a security incident based on an analysis thereof.

Figure 3B:
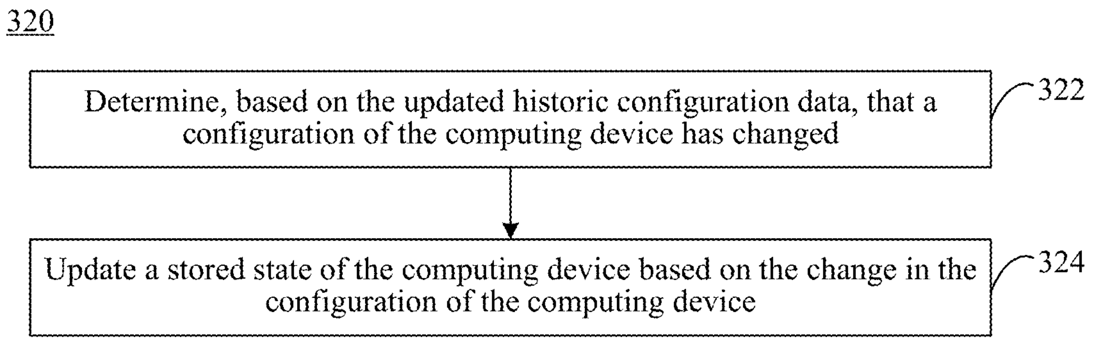
FIG. 3B depicts a flowchart of a process for updating a stored state of a computing device, in accordance with an example embodiment.

As described above, network monitor 112 of FIG. 2 may include state processor 204. In accordance with an embodiment, state processor 204 is configured to receive indication 224 and update configuration state data 218. State processor 204 may be configured to update configuration state data 218 in various ways. For example, FIG. 3B depicts a flowchart 320 of a process for updating a stored state of a computing device, in accordance with an example embodiment. State processor 204 may operate according to flowchart 320 in embodiments. In embodiments, state processor 204 is configured to update configuration state data 218 stored in state store 214. As discussed above with respect to FIG. 2, state store 214 may be a mutable storage system configured to store configuration state data 218 indicative of the latest configuration data of computing devices and/or entities of system 100. Note that not all steps of flowchart 320 need be performed in all embodiments. Further structural and operational embodiments will be apparent to persons skilled in the relevant art(s) based on the following description of FIG. 3B with respect to FIG. 2.

Flowchart 320 begins with step 322. Step 322 of flowchart 320 may be performed subsequent to step 302 of flowchart 300, as described with respect to FIG. 3A above. In step 322, a determination that a configuration of the computing device has changed is made based on the updated historic configuration data. For example, state processor 204 of FIG. 2 receives indication 224 indicating historic configuration data 216 has been updated. As shown in FIG. 2, state processor 204 is configured to obtain updated historic configuration data 226 responsive to receiving indication 224. Updated historic configuration data 226 may include all of or some of historic configuration data 216. For example, updated historic configuration data 226 may include the same information as updated historic configuration data 232, as discussed above. State processor 204 is configured to determine whether a configuration of computing device 108 of FIG. 1 has changed based on updated historic configuration data 226. If a configuration of the computing device has changed, flowchart 320 proceeds to step 324. Otherwise, flowchart 320 ends (e.g., and flowchart 300 ends or proceeds to step 306).

In step 324, a stored state of the computing device is updated based on the change in the configuration of the computing device. For example, state processor 204 is configured to update configuration state data 218 by writing processed state data 228 to configuration state data 218. State processor 204 may overwrite the entirety of configuration state data 218 with processed state data 228. Alternatively, state processor 204 may overwrite modified, changed, or updated portions of configuration state data 218 with corresponding portions of processed state data 228. Furthermore, state processor 204 may be configured to generate indication 230 indicative that configuration state data 218 has been updated. In this context, relationship manager 206 may be configured to determine whether a relationship between computing device 108 and an entity of entities 110A-110N has changed based on updated historic configuration data 232 and updates to configuration state data 218.

Thus, a state processor, state store, and process for updating a stored state have been described with respect to FIGS. 2 and 3B. Components and subcomponents of system 100 may refer to configuration state data 218 to determine the latest configuration state of computing device 108 and/or entities 110A-110N of FIG. 1. For instance, security incident detector 114 may access configuration state data 218 and provide all or a portion of configuration state data 218 to incident detection model 208 in order to determine if at least a portion of configuration state data 218 evidences a security incident. Moreover, components and subcomponents of system 100 may access configuration state data 218 to obtain a snapshot view of the current state of computer system infrastructure 102, a subset of computer system infrastructure 102, computing device 108, and/or entities 110A-110N. Furthermore, relationship manager 206 may be configured to access configuration state data 218 to determine current relationships between two or more of computing device 108 and/or entities 110A-110N.

Figure 4:
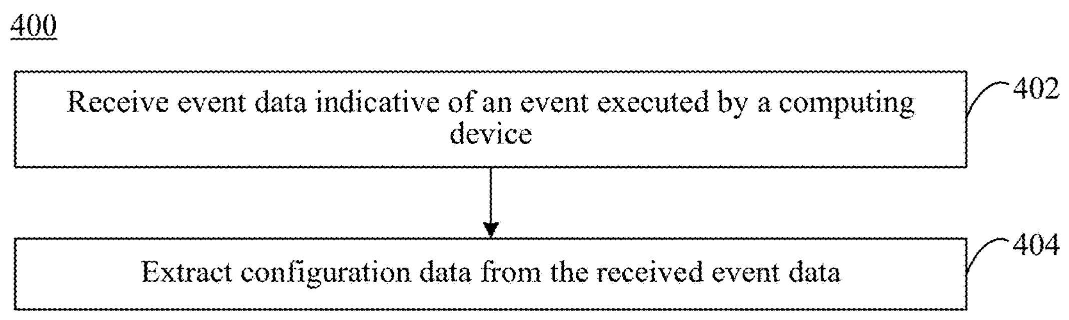
FIG. 4 depicts a flowchart of a process for extracting configuration data, according to an example embodiment.
Figure 5:
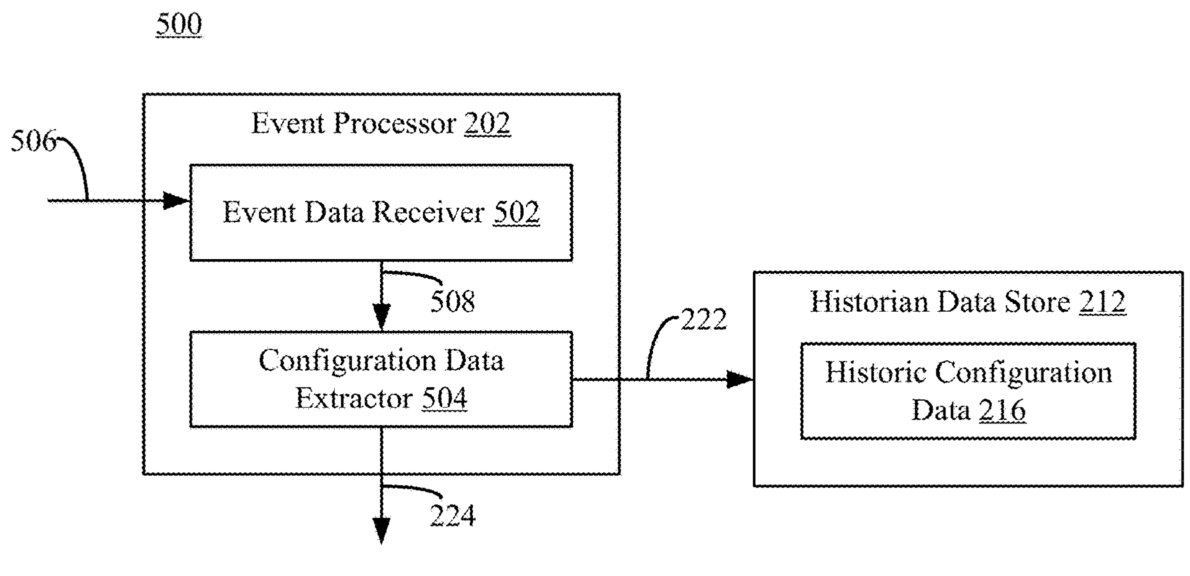
FIG. 5 is a block diagram of the event processor and historian data store of FIG. 2, according to an example embodiment.

As described above, network monitor 112 of FIG. 2 may include event processor 202. In accordance with an embodiment, event processor 202 is configured to receive event data including configuration data 220 and extract configuration data 220 to generate processed configuration data 222 and indication 224. Event processor 202 may be configured to extract configuration data 220 in various ways. For example, FIG. 4 depicts a flowchart 400 of a process for extracting configuration data, according to an example embodiment. Event processor 202 may operate according to flowchart 400 in embodiments. For illustrative purposes, flowchart 400 is described below with respect to FIG. 5. FIG. 5 is a block diagram of the event processor 202 and historian data store 212 of FIG. 2, according to an example embodiment. As shown in FIG. 5, event processor 202 includes an event data receiver 502 and a configuration data extractor 504, and historian data store 212 is configured to store historic configuration data 216, as discussed above with respect to FIG. 2. Note that not all steps of flowchart 400 need be performed in all embodiments. Further structural and operational embodiments will be apparent to persons skilled in the relevant art(s) based on the following descriptions of FIGS. 4 and 5.

Flowchart 400 begins with step 402. In step 402, event data indicative of an event executed by a computing device. For instance, event data receiver 502 of FIG. 5 is configured to receive event data 506. Event data 506 may include one or more event records indicative of events executed by computing device 108, entities 110A-110N, and/or another component or subcomponent of system 100 of FIG. 1. Each event record may include configuration data corresponding to the executing device/entity (e.g., configuration data 220, as described above with respect to FIGS. 2 and 3), a time that event was created and/or executed, the time taken to complete execution of the event, associated entities and/or computing devices, parent and/or child events, and/or any other characteristics associated with the execution of the event. As shown in FIG. 5, event data receiver 502 generates received event data 508, which may include all of or a portion of event data 506. Moreover, event data receiver 502 may generate received event data 508 by processing event data 506 (e.g., changing a file format of event data 506 or modifying event data 506).

In step 404, configuration data is extracted from the received event data. For instance, configuration data extractor 504 of FIG. 5 is configured to extract configuration data 220 from received event data 508. For instance, configuration data extractor 504 may identify configuration data 220 within event records of event data 508, extract the identified configuration data, and generate processed configuration data 222.

Following step 404, step 302 of FIG. 3A may be performed, as described above. For example, configuration data extractor 504 of FIG. 5 may write processed configuration data 222 to historic configuration data 216. Furthermore, configuration data extractor 504 may generate indication 224 indicating historic configuration data 216 has been updated.

Figure 6A:
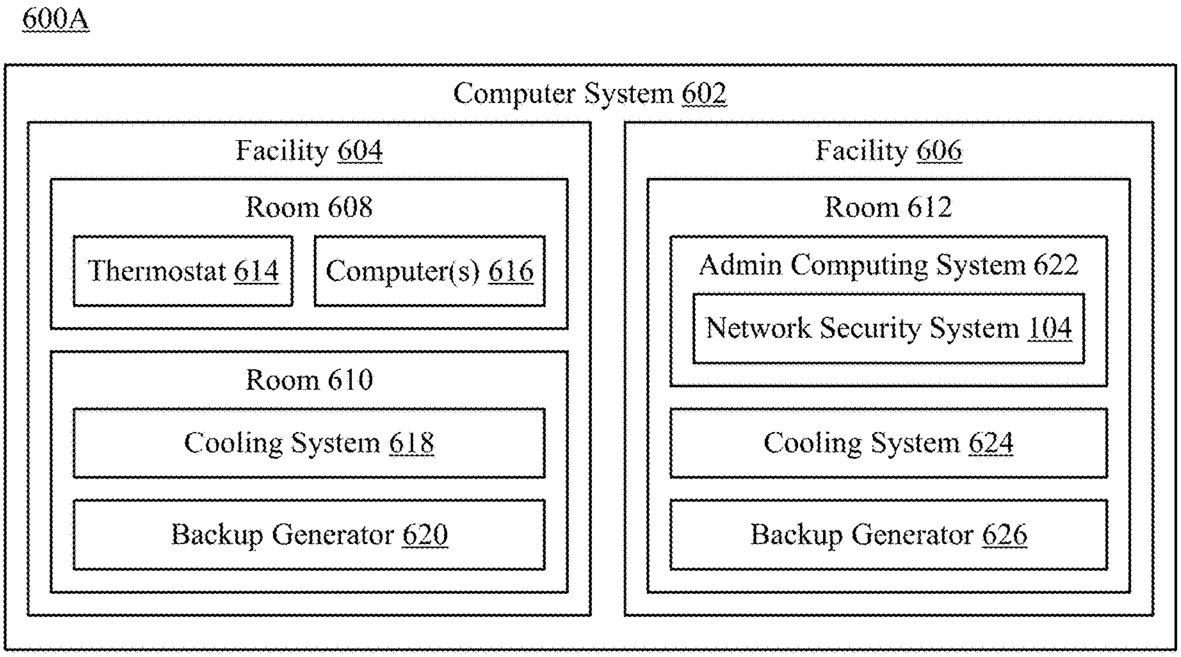
FIG. 6A is a block diagram of a computer system containing a plurality of entities, according to an example embodiment.

As discussed above, network security system 104 is configured to monitor changes in a computer system, such as system 100. Such computer systems may include several computing devices and/or entities, each configured to execute respective events. Furthermore, computing devices and entities may be arranged within a computer system in various manners, depending on the particular implementation. For example, FIG. 6A is a diagram of a computer system 602 ("system 602" herein) for understanding security incident detection techniques described herein. Further structural and operational examples will be apparent to persons skilled in the relevant art(s) based on the following description of FIG. 6A.

As shown in FIG. 6A, system 602 includes facilities 604 and 606. Facility 604 includes rooms 608 and 610 and facility 606 includes room 612. Room 608 includes thermostat 614 and one or more computer(s) 616, room 610 includes cooling system 618 and backup generator 620, and room 612 includes admin computing system 622, cooling system 624, and backup generator 626. Admin computing system 622 includes network security system 104. Facilities 604 and 606, rooms 608, 610, and 612, thermostat 614, computer(s) 616, cooling systems 618 and 624, backup generators 620 and 626, and admin computing system 622 may be collectively referred to as "entities of system 602" herein. Note that system 602 may include any number of additional facilities, rooms, computers, and/or other entities, not shown in FIG. 6A for brevity and illustrative clarity. Some or all entities of system 602 may communicate over a network (e.g., network 106 of FIG. 1).

In the context of system 602, network security system 104 as described with respect to FIGS. 2-5 receives event data (e.g., event records) indicative of events executed by entities of system 602. Network security system 104 updates historic configuration data, if there are any changes to configurations of entities of system 602; determines if any relationships between entities have changed; determine whether updated historic configuration data evidences a security incident and if so, generate an indication thereof; and, if such an indication is generated, generate a security alert indicative of the evidenced security incident.

Figure 6B:
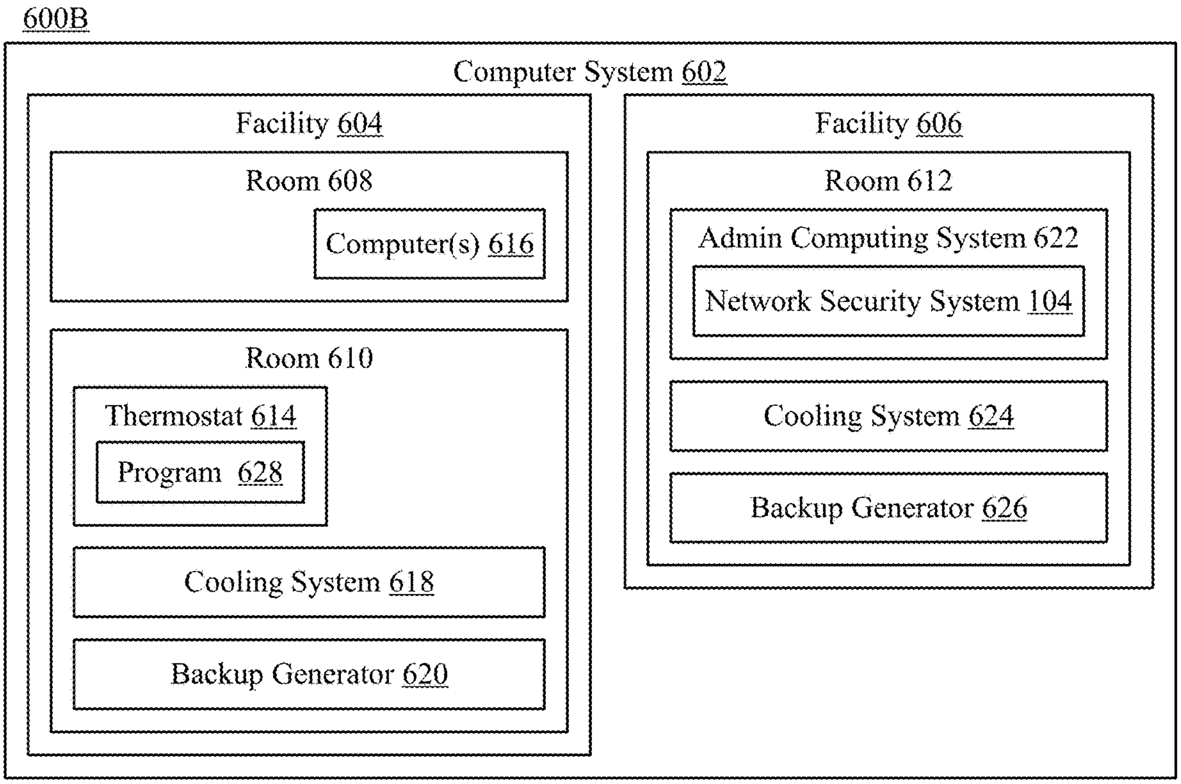
FIG. 6B is a block diagram of the computer system of FIG. 6A with a change in configuration of an entity, according to an example embodiment.

As discussed elsewhere herein, network security system 104 may detect various changes in configurations of and/or changes in relationships between entities of system 602. To help further illustrate the features of network security system 104 with respect to system 602, FIG. 6B will now be described. In particular, FIG. 6B is a block diagram of system 602 of FIG. 6A with a change in configuration of an entity for understanding security incident detection techniques described herein. Further structural and operational examples will be apparent to persons skilled in the relevant art(s) based on the following description of FIG. 6B.

As shown in FIG. 6B, thermostat 614 of system 602 has been relocated from room 608 to room 610 and now includes program 628. In the context of FIG. 6B, network security system 104 as described with respect to FIGS. 2-5 is configured to detect potential security incidents based on configuration data and updates to historic configuration data. For instance, network security system 104 receives event data (e.g., event data 506) indicative of events executed by entities of system 602, such as thermostat 614. With respect to FIG. 6B, an event record received by network security system 104 includes configuration data (e.g., configuration data 220) indicative of a change in configuration of thermostat 614 in system 602. Network security system 104 updates historic configuration data (e.g., historic configuration data 216) based on the configuration data and determines, based on the updated historic configuration data, that relationships between thermostat 614 and other entities of system 600 have changed. For example, network security system 104 may determine that thermostat 614 is no longer located in room 608, determine that thermostat 614 is now located in room 610, determine that thermostat 614 is executing program 628, and/or otherwise determine a relationship between thermostat 614 and other entities of system 600 has changed. Furthermore, network security system 104 may update configuration state data (e.g., configuration state data 218) corresponding to thermostat 614 with the current configuration state of thermostat 614. Network security system 104 provides the updated historic configuration data to a ML model (e.g., incident detection model 208) configured to generate an indication of whether the updated historic configuration data evidences a security incident. For instance, the ML model may determine program 628 corresponds to a malware program, determine relocating thermostat 614 from room 608 to 610 breaches a security policy of system 600, determine installing program 628 on thermostat 614 breaches a security policy of system 600, and/or otherwise determine the updated historic configuration data evidences a security incident. If the updated historic configuration data evidences a security incident, the ML model generates an indication that the updated historic configuration data evidences the security incident (e.g., indication 236) and network security system 104 generates a security alert indicative of the security incident (e.g., security alert 238). A mitigation operation may be performed in response to the ML model generating the indication.

Depending on the implementation, various mitigation operations may be performed in response to the ML model generating the indication. For instance, network security system 104 may transmit a notification to an administrator of admin computing system 622, transmit a command to thermostat 614 to power down, transmit a command to a network management system of system 600 to isolate network communication to and from thermostat 614 and/or other entities of room 610 and/or room 608, transmit a command to thermostat 614 to cease execution of a process associated with program 628, transmit a notification to users associated with thermostat 614, transmit a notification to users of computing devices (e.g., computer(s) 616) that communicate with thermostat 614, transmit a command to cooling system 618 to stop communication with thermostat 614, and/or transmit any other notifications and/or commands to mitigate the potential security incident, as described elsewhere herein.

III. Further Example Embodiments and Advantages

As noted above, systems and devices may be configured in various ways for security incident detection based on historian configuration data collected over time. Example embodiments have been described with respect to cyber-physical systems; however, it is also contemplated herein that embodiments of security incident detection described herein may be implemented in other computer systems as well. For example, a network security system may be implemented in embedded computer system or a cloud computing system.

Furthermore, several example computer systems have been described with example computing devices, entities, and network security systems. It is contemplated herein that systems and techniques for security incident detection may be extended to computer systems that include any number of computing devices, entities, and/or network security systems. For instance, a network security system for detecting security incidents may monitor events executed in an entirety of a computer system or a subset of the computer system. For example, a cyber-physical system may include a network security system for each facility in the cyber-physical system. In this context, each network security system may be configured to monitor events executed by respective entities. Furthermore, each network security system may operate independently, communicate with one another, and/or communicate with a centralized network security system.

Network security systems have been described herein with respect to real time detection of security incidents; however, it is also contemplated herein that a network security system may detect security incidents in response to a request (e.g., by an administrator) or periodically. For example, a network security system may evaluate historic configuration data in response to a security audit. The security audit may request evaluation of historic configuration data for an entire computer system or a subset of the computer system. Furthermore, depending on the resulting evaluation, additional security audits may be performed. For example, if a security audit determines updated historic configuration data of a computing device of the computer system evidences a security incident, an additional security audit for entities corresponding to the computing device or the entirety of the computer system may be requested.

Moreover, network security systems may communicate with an administrator interface in order to receive requests and provide responses. Requests may be submitted to the network security system by placing an application programming interface (API) call using the administrator interface (referred to as "request API calls" herein). Request API calls may be used to request an action to be performed with respect to a computer system (e.g., a request to perform a security audit, a request to isolate a computing device or entity, or a request to power down a computing device or entity), a request for information associated with the computing device (e.g., historic configuration data stored in a historian data store, configuration state data stored in a state store, event data (e.g., event records), or updates to historic configuration data and/or configuration state data), and/or any other request applicable to network security system and security incident detection. Furthermore, network security system may provide notifications to the administrator interface by executing a response API. Response APIs may be executed in response to a request API call made by an administrator via the administrator interface, in response to real time processing by the network security system, or as part of periodic performance of the network security system.

As discussed herein, historian data stores (e.g., historian data store 212) may be immutable data storage systems. In this context, a hash value is generated for configuration data received by a network security system. For example, a hash value may be generated based on an event record and its attributes (including the configuration data). The hash value may be stored in a hash store. A network security system may be configured to perform a security audit by generating a hash value for a configuration log stored in a historian data store and comparing the generated hash value to a corresponding hash value stored in the hash store. In this way, network security systems may determine if historian data store has been modified, changed, and/or otherwise compromised.

Incident detection models have been described herein as including one or more ML models configured to generate an indication of whether updated historic configuration data evidences a security incident. Such ML models may be trained in various ways. For example, a ML model may be trained using historic configuration data that corresponds to known security incidents and historic configuration data that corresponds to known benign changes. Furthermore, ML models may be updated periodically or continuously over time. For instance, ML models may be updated using a subset (e.g., 70%) of a configuration data received by a network security system.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

IV. Example Computer System Implementation

System 100, computer system infrastructure 102, network security system 104, computing device 108, entities 110A-110N, network monitor 112, security incident detector 114, mitigator 116, event processor 202, state processor 204, relationship 206, incident detection model 208, security alert generator 210, historian data store 212, state store 214, flowchart 300, flowchart 320, flowchart 400, event data receiver 502, configuration data extractor 504, system 602, thermostat 614, computer(s) 616, cooling system 618, backup generator 620, admin computing system 622, cooling system 624, backup generator 626, and/or program 628 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 7:
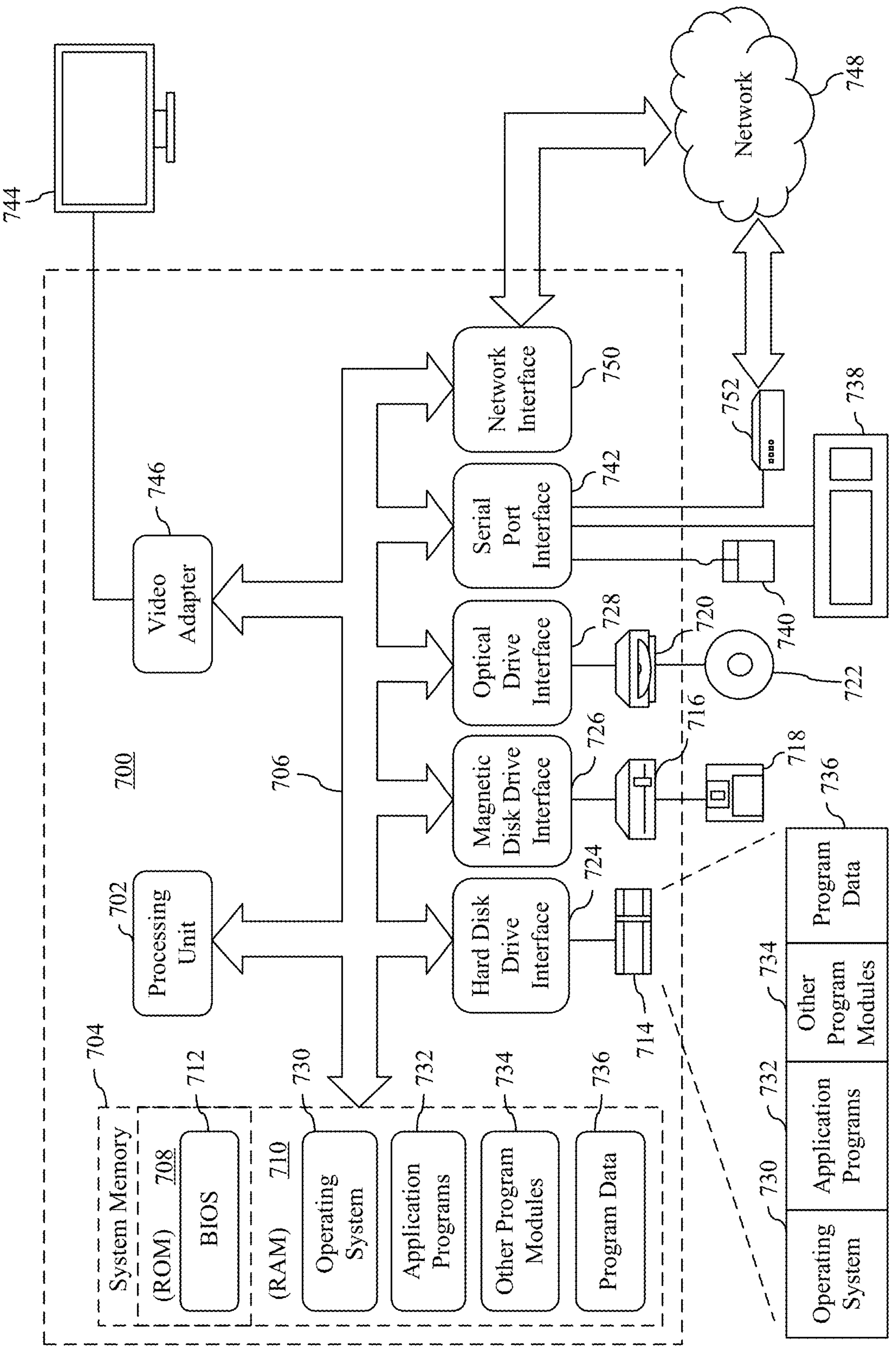
FIG. 7 is a block diagram of an example computing device that may be used to implement embodiments.

FIG. 7 depicts an exemplary implementation of a computer system 700 ("system 700" herein) in which embodiments may be implemented. For example, system 700 may be used to implement system 100, computing system infrastructure 102, network security system 104, computing device 108, entities 110A-110N, network monitor 112, security incident detector 114, and/or mitigator 116, as described above in reference to FIG. 1. System 700 may also be used to implement event processor 202, state processor 204, relationship manager 206, incident detection model 208, security alert generator 210, historian data store 212, and/or state store 214 as described above in reference to FIG. 2. System 700 may also be used to implement event data receiver 502 and/or configuration data extractor 504, as described above in reference to FIG. 5. System 700 may also be used to implement computer system 602, thermostat 614, computer(s) 616, cooling system 618, backup generator 620, admin computing system 622, cooling system 624, backup generator 626, and/or program 628, as described above in reference to FIGS. 6A and 6B. System 700 may also be used to implement any of the steps of any of the flowcharts of FIGS. 3A, 3B, and/or 4, as described above. The description of system 700 provided herein is provided for purposes of illustration and is not intended to be limiting. Embodiments may be implemented in further types of computer systems, as would be known to persons skilled in the relevant art(s).

As shown in FIG. 7, system 700 includes one or more processors, referred to as processing unit 702, a system memory 704, and a bus 706 that couples various system components including system memory 704 to processing unit 702. Processing unit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processing unit 702 may execute program code stored in a computer readable medium, such as program code of operating system 730, application programs 732, other program modules 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

System 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards and drives (e.g., solid state drives (SSDs)), digital video disks, RAMS, ROMs, and other hardware storage media.

A number of program modules or components may be stored on the hard disk, magnetic disk, optical disk, ROM, or RAM. These program modules include an operating system 730, one or more application programs 732, other program modules 734, and program data 736. In accordance with various embodiments, the program modules may include computer program logic that is executable by processing unit 702 to perform any or all the functions and features of network security system 104, entities 110A-110N, network monitor 112, security incident detector 114, mitigator 116, event processor 202, state processor 204, relationship manager 206, incident detection model 208, security alert generator 210, historian data store 212, state store 214, flowchart 300, flowchart 320, flowchart 400, event data receiver 502, configuration data extractor 504, and/or program 628 (including any steps of flowcharts 300, 320, and/or 400).

A user may enter commands and information into the system 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processing unit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in, system 700. Display screen 744 may display information, as well as being a user interface for receiving user commands and/or other information (e.g., by touch, finger gestures, virtual keyboard, etc.). For example, display screen 744 may implement an interface (e.g., a user interface configured for use by a user of computing device 108 of FIG. 1 and/or computer(s) 616 of FIGS. 6A and 6B, a developer interface configured for use by a developer associated with system 100 of FIG. 1 and/or system 602 of FIGS. 6A and 6B, and/or an administrator interface for use by an administrator associated with system 100 of FIG. 1 and/or system 602 of FIGS. 6A and 6B). The interface may be configured to display information associated with computer system infrastructure 102 and/or network security system 104, as described above with reference to FIG. 1, historic configuration data 216, configuration state data 218, configuration data 220, processed configuration data 222, indication 224, updated historic configuration data 226, processed state data 228, indication 230, updated historic configuration data 232, indication 236, security alert 238, and/or information associated with mitigation signal 240, as described above with reference to FIG. 2, event data 506, received event data 508, and/or event records, as described above with reference to FIG. 5, information associated with system 602 and/or entities thereof, as described above with reference to FIGS. 6A and 6B, and/or other information associated with security incident detection for computer systems. In addition to display screen 744, system 700 may include other peripheral output devices (not shown) such as speakers and printers.

System 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other program modules 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable system 700 to implement features of embodiments described herein. Accordingly, such computer programs represent controllers of the system 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware. In accordance with various embodiments, the program modules may include computer program logic that is executable by processing unit 702 to perform any or all of the functions and features of network security system 104, entities 110A-110N, network monitor 112, security incident detector 114, and/or mitigator 116 as described above in reference to FIG. 1, event processor 202, state processor 204, relationship manager 206, incident detection model 208, security alert generator 210, historian data store 212, and/or state store 214 as described above in reference to FIG. 2, event data receiver 502 and/or configuration data extractor 504 as described above in reference to FIG. 5, and/or program 628 as described above in reference to FIG. 6B. The program modules may also include computer program logic that, when executed by processing unit 702, causes processing unit 702 to perform any of the steps of any of the flowcharts of FIGS. 3A, 3B, and/or 4, as described above.

V. Additional Exemplary Embodiments

In an embodiment, a networked computing system includes one or more processors and memory that stores program code. The program code is executable by the one or more processors to cause the networked computer system to update historic configuration data associated with a computing device based on received configuration data. The received configuration data is indicative of a change in configuration of the computing device in a computer system. The historic configuration data indicates changes to configurations of the computing device over a time period. The program code executable by the one or more processors is further configured to cause the networked computer system to determine, based on the updated historic configuration data, that a relationship between the computing device and an entity of the computer system has changed. In response to determining that the relationship between the computing device and the entity of the computer system has changed, the program code executable by the one or more processors is further configured to cause the networked computer system to provide the updated historic configuration data as input to a machine learning (ML) model. The ML model is configured to generate an indication of whether the updated historic configuration data evidences a security incident. In response to the ML model generating an indication that the updated historic configuration data evidences a security incident, the program code executable by the one or more processors is further configured to cause the networked computer system to generate a security alert indicative of the evidenced security incident.

In an embodiment, the change in the relationship between the computing device and the entity of the computer system is one of: a creation of the relationship between the computing device and the entity; a discontinuation of the relationship between the computing device and the entity; or a modification of the relationship between the computing device and the entity.

In an embodiment, the ML model is configured to generate the indication that the updated historic configuration data evidences a security incident by analyzing changes in the relationship between the computing device and the entity over the time period.

In an embodiment, the analyzed changes in the relationship between the computing device and entity over the time period indicate at least one of: an unrecognized device inserted in a universal serial bus (USB) port of the computing device; rapid password changes for a user account associated with the computing device; abnormal network traffic between the computing device and the entity; and an internet protocol (IP) port of the computing device being accessed by a software process.

In an embodiment, the program code executable by the one or more processors is further configured to cause the networked computer system to perform a mitigation operation in response to the ML model generating an indication that the updated historic configuration data evidences a security incident. The mitigation operation includes at least one of: transmitting a message indicative of the security incident to a developer associated with the computer system; recommending an action to address the security incident; or implementing a protection mechanism.

In an embodiment, the relationship between the computing device and the entity indicates: the computing device is part of a facility of the computer system; the computing device is affected by a security control instance; the computing device is part of group critical infrastructure; or the computing device is located at a particular geographic location.

In an embodiment, the program code executable by the one or more processors is further configured to cause the networked computer system to receive job event data indicative of a job event executed by the computing device and extract the configuration data from the received job event data.

In an embodiment, the program code executable by the one or more processors is further configured to cause the networked computer system to update a stored state of the computing device based on the received configuration data.

In an embodiment, the historic configuration data is stored in an immutable data stream storage system.

In an embodiment, a method is performed. The method includes updating historic configuration data associated with a computing device based on received configuration data. The received configuration data is indicative of a change in configuration of the computing device in a computer system. The historic configuration data indicates changes to configurations of the computing device over a time period. A determination that a relationship between the computing device and an entity of the computer system has changed based on the updated historic configuration data. The updated historic configuration data is provided as input to a machine learning (ML) model. The ML model is configured to generate an indication of whether the updated historic configuration data evidences a security incident. In response to the ML model generating an indication that the updated historic configuration data evidences a security incident, a security alert indicative of the evidenced security incident is generated.

In an embodiment, determining that a relationship between the computing device and the entity of the computer system has changed includes at least one of: determining the relationship between the computing device and the entity is a newly created relationship; determining the relationship between the computing device and the entity has been discontinued; or determining the relationship between the computing device and the entity has been modified.

In an embodiment, the ML model is configured to generate the indication that the updated historic configuration data evidences a security incident by analyzing changes in the relationship between the computing device and the entity over the time period.

In an embodiment, the analyzed changes in the relationship between the computing device and entity over the time period indicate at least one of: an unrecognized device inserted in a universal serial bus (USB) port of the computing device; rapid password changes for a user account associated with the computing device; abnormal network traffic between the computing device and the entity; and an internet protocol (IP) port of the computing device being accessed by a software process.

In an embodiment, the method further includes performing a mitigation operation in response to the ML model generating an indication that the updated historic configuration data evidences a security incident. The mitigation operation includes at least one of: transmitting a message indicative of the security incident to a developer associated with the computer system; recommending an action to address the security incident; or implementing a protection mechanism.

In an embodiment, the relationship between the computing device and the entity indicates: the computing device is part of a facility of the computer system; the computing device is affected by a security control instance; the computing device is part of group critical infrastructure; or the computing device is located at a particular geographic location.

In an embodiment, the method further includes receiving job event data indicative of a job event executed by the computing device and extracting the configuration data from the received job event data.

In an embodiment, the method further includes updating a stored state of the computing device based on the received configuration data.

In an embodiment, the historic configuration data is stored in an immutable data stream storage system.

In an embodiment, a computer-readable storage medium has programming instructions encoded thereon that are executable by one or more processors to perform a method. The method includes updating historic configuration data associated with a computing device based on received configuration data. The received configuration data is indicative of a change in configuration of the computing device in a computer system. The historic configuration data indicates changes to configurations of the computing device over a time period. A determination that a relationship between the computing device and an entity of the computer system has changed is made based on the updated historic configuration data. The updated historic configuration data is provided as input to a machine learning (ML) model. The ML model is configured to generate an indication of whether the updated historic configuration data evidences a security incident. In response to the ML model generating an indication that the updated historic configuration data evidences a security incident, a security alert indicative of the evidenced security incident is generated.

In an embodiment, the ML model is configured to generate the indication that the updated historic configuration data evidences a security incident by analyzing changes in the relationship between the computing device and the entity over the time period.

VI. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method comprising:

generating a first hash value based on an event record associated with a computing device of a computer system;

storing the first hash value in a hash store;

receiving, from a historian data store, a configuration log associated with the computing device;

generating a second hash value based on the configuration log associated with the computing device;

determining, based on a comparison between the first hash value and the second hash value, a security incident with respect to the computing device; and generating a security alert indicative of the security incident with respect to the computing device.

2. The method of claim 1, further comprising:

receiving a security audit request, wherein said receiving the configuration log is responsive to the security audit request.

3. The method of claim 1, wherein said determining the security incident further comprises:

determining the historian data store has been modified.

4. The method of claim 3, further comprising:

subsequent to said determining the historian data store has been modified, performing a security audit for an entity of the computing system corresponding to the computing device.

5. The method of claim 4, wherein said performing the security audit for the entity comprises:

generating a third hash value based on a configuration log associated with the entity; and determining, based on a comparison the third hash value with a fourth hash value corresponding to an event record associated with the entity, a security incident with respect to the entity.

6. The method of claim 4, wherein the entity comprises:

a virtual component executing on the computing device;

a stationary facility comprising the computing device;

a networking device communicatively coupled to the computing device; or another computing device in a group of computing devices comprising the computing device.

7. The method of claim 1, wherein the historian data store is an immutable data stream storage system.

8. A networked computing system comprising:

a processor; and memory storing program code structured to cause the processor to:

receive a security audit request for a computing device of a computer system, receive, from a historian data store, a configuration log associated with the computing device, generate a first hash value based on the configuration log associated with the computing device, compare the first hash value to a second hash value corresponding to an event record associated with the computing device, resulting in a comparison result, determine, based on the comparison result, a security incident with respect to the computing device, and perform a mitigation operation based on the determined security incident.

9. The networked computing system of claim 8, wherein to preform a mitigation operation, the program code is structured to further cause the processor to:

generate a security alert indicative of the security incident with respect to the computing device.

10. The networked computing system of claim 8, wherein the program code is structured to further cause the processor to:

generate the second hash value based on the event record.

11. The networked computing system of claim 10, wherein the program code is structured to further cause the processor to:

store the second hash value in a hash store; and wherein to compare the first hash value to the second hash value, the program code is further structured to cause the processor to obtain the second hash value from the hash store.

12. The networked computing system of claim 8, wherein to determine the security incident, the program code is further structured to cause the processor to:

determine the historian data store has been modified.

13. The networked computing system of claim 12, wherein to perform the mitigation operation, the program code is further structured to cause the processor to:

perform an additional audit for an entity of the computing system corresponding to the computing device.

14. The networked computing system of claim 13, wherein to perform the additional audit for the entity, the program code is further structured to cause the processor to:

generate a third hash value based on a configuration log associated with the entity; and determine, based on a comparison the third hash value with a fourth hash value corresponding to an event record associated with the entity, a security incident with respect to the entity.

15. The networked computing system of claim 8, wherein the historian data store is an immutable data stream storage system.

16. A computer-readable storage medium having programming instructions encoded thereon structured to cause a processor to perform a method, the method comprising:

receiving a security audit request for a computing device of a computer system, receiving, from a historian data store, a configuration log associated with the computing device, generating a first hash value based on the configuration log associated with the computing device, comparing the first hash value to a second hash value corresponding to an event record associated with the computing device, resulting in a comparison result, determining, based on the comparison result, a security incident with respect to the computing device, and generating a security alert indicative of the security incident with respect to the computing device.

17. The computer-readable storage medium of claim 16, wherein the method further comprises:

generating the second hash value based on the event record; and storing the second hash value in a hash store.

18. The computer-readable storage medium of claim 16, wherein said determining the security incident comprises:

determining the historian data store has been modified.

19. The computer-readable storage medium of claim 18, wherein the method further comprises:

subsequent to the determination that the historian data store has been modified, performing an additional audit for an entity of the computing system corresponding to the computing device.

20. The computer-readable storage medium of claim 19, wherein said performing the additional audit for the entity comprises:

generating a third hash value based on a configuration log associated with the entity; and determining, based on a comparison the third hash value with a fourth hash value corresponding to an event record associated with the entity, a security incident with respect to the entity.

* * * * *